(12) United States Patent
Rajaraman et al.

(10) Patent No.: US 11,334,577 B2
(45) Date of Patent: May 17, 2022

(54) DATABASE QUERY HANDLING USING PRE-CALCULATED ASSOCIATION PAGINATION RANKING

(71) Applicant: SAP SE, Walldorf (DE)

(72) Inventors: Ramana Kumar Rajaraman, Bengaluru (IN); Nagendra Manchuri, Bengaluru (IN)

(73) Assignee: SAP SE, Walldorf (DE)

( * ) Notice: Subject to any disclaimer, the term of this patent is extended or adjusted under 35 U.S.C. 154(b) by 43 days.

(21) Appl. No.: 16/898,258

(22) Filed: Jun. 10, 2020

(65) Prior Publication Data

US 2021/0334286 A1  Oct. 28, 2021

(30) Foreign Application Priority Data

Apr. 22, 2020 (IN) .............................. 202011017209

(51) Int. Cl.
*G06F 16/2457* (2019.01)
*G06F 16/215* (2019.01)
*G06F 16/23* (2019.01)

(52) U.S. Cl.
CPC ...... *G06F 16/24578* (2019.01); *G06F 16/215* (2019.01); *G06F 16/2379* (2019.01)

(58) Field of Classification Search
CPC .......... G06F 16/24578; G06F 16/2379; G06F 16/215
See application file for complete search history.

(56) References Cited

U.S. PATENT DOCUMENTS 7,111,020 B1 * 9/2006 Gupta ............... G06F 16/24539
2014/0358845 A1 * 12/2014 Mundlapudi ......... G06F 16/283
707/602

OTHER PUBLICATIONS

"Data Fating by OFFSET . . . FECTCH and CTR—Sql Server", by Basavaraj Biradar, Sep. 5, 2015, https://sqlhints.com/tag/data-paging-by-offsetfetch/. (Year: 2015).*

* cited by examiner

*Primary Examiner* — Jaya Morrison
(74) *Attorney, Agent, or Firm* — Klarquist Sparkman, LLP (57) ABSTRACT

Enhanced database query handling is provided using pre-calculated association pagination ranking. Such pre-calculated rankings can be generated using various approaches including by calculating rank along with an intersection, addition, and deletion of association rows corresponding to a parent row being modified or by a stored procedure which uses the ranking operations. Related apparatus, systems, techniques and articles are also described.

17 Claims, 4 Drawing Sheets

DATABASE QUERY HANDLING USING PRE-CALCULATED ASSOCIATION PAGINATION RANKING

RELATED APPLICATION

The current application claims priority to Indian Patent Application No. 202011017209 filed on Apr. 22, 2020, the contents of which are hereby fully incorporated by reference.

TECHNICAL FIELD

The subject matter described herein relates to enhanced database query handling using pre-calculated pagination ranking.

BACKGROUND

In relational database systems, pagination for an association table results in complex queries and poor performance. Such performance issues are particularly prevalent with complex database systems having large amounts of master data with associations. With such arrangements, pagination at the association level becomes complicated thereby consuming unnecessary computing resources which, in turn, causes slower performance.

SUMMARY

Enhanced database query handling is provided using pre-calculated association pagination ranking. Such pre-calculated rankings can be generated using various approaches including by calculating rank along with intersection, addition, and deletion of association rows corresponding to a parent row being modified or by a stored procedure which uses various ranking operations.

In a first aspect, efficient database query handling is enabled by loading a parent row in memory. Thereafter, at least one attribute is updated in the parent row. An intersection, addition, and deletion of association rows corresponding to the parent row is then calculated. Thereafter, a ranking for each association row is calculated. A ranking for each association row is then determined based on the calculating. Rankings for the association rows are next updated with the determined rankings.

The determining can include loading all association rows into memory.

The database can receive a query specifying an offset and a number of ranked records. Results can then be provided which are responsive to the query using the rankings in association rows responsive to the query.

The calculating can include determining whether each association row has been updated or inserted. The association rows that have been updated or inserted can be sorted by a corresponding ranking column. A ranking column can be updated for at least a portion of the association rules based on the sorting.

A database transaction can be opened to cause the loading of the parent row. Operations specified by the database transactions can be committed. After such time, the database transaction can be closed after the operations are committed.

In an interrelated aspect, efficient database query handling can be effected by loading a plurality of parent rows into memory. Next, for each parent row, all corresponding association rows are selected. A rank for each association row is then calculated using a ranking function. Each association row is next updated with the calculated rank. The association rows can then be committed.

The ranking function can be a dense rank or equivalent operation to determine the ranking for each association row.

A stored procedure can be initiated prior to the loading of the plurality of parent rows in memory and the stored procedure can end after the association rows are committed. The stored procedure can be executed in response to the updating. The stored procedure can be executed as a background task which, in turn, can be executed on a periodic basis.

The database can receive a query specifying an offset and a number of ranked records. Results can then be provided which are responsive to the query using the rankings in association rows responsive to the query.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DETAILED DESCRIPTION

The current subject matter is directed to enhanced techniques for database query handling in which rankings of rows are pre-calculated which, in turn, enables for more efficient handling of pagination-based queries (i.e., queries in which pagination is handled at the association level). The current subject matter is particularly applicable for database systems in which there are large amounts of master data with each corresponding value/entry having large numbers of associations across one or more tables. The master data and its associations do not change frequently but are accessed frequently across various transactions. Typically, database reads overwhelm the database writes by a greater extent. Rather than providing complete results of association records to a query, a subset of the corresponding association records can be provided at any given time on a page (i.e., pagination of query results).

As an example, the following tables 1 and 2 have one-to-many relationships. For conciseness, only required columns are considered in each of the tables. In reality, there could be many other columns representing the actual entity. There could also be other ways such as intermediate tables to represent the relationship. The representation of relationship using an identifier or primary key column of the related table remains the same across multiple approaches.

User table (table 1) has one-to-many relationships with Group table (Table 2).

TABLE 1

User Table

| Id | Name |
|---|---|
| 1 | User-1 |
| 2 | User-2 |
| 3 | User-3 |
| 4 | User-4 |
| 5 | User-5 |

TABLE 2

Group Table

| Id | Name | UserId |
|---|---|---|
| 1 | Group-1 | 1 |
| 2 | Group-2 | 1 |
| 3 | Group-3 | 1 |
| 4 | Group-4 | 1 |
| 5 | Group-5 | 2 |
| 6 | Group-6 | 2 |
| 7 | Group-7 | 2 |
| 8 | Group-8 | 3 |
| 9 | Group-9 | 3 |
| 10 | Group-10 | 4 |

To fetch user and its associations say n at a time, the most common approach followed is to paginate the association tables using a ranking.

Query 1:
select U.Id as UserId, G.name as GroupName from user U
  left outer join
  (select *, dense_rank( ) over (partition by uid order by id) as rank from group) G on (U.id=G.uid)
  where (rank>=(offset) and rank<(offset+n))
  order by U.Id As noted above, the above query comprises a dense rank operation that computes the rank to form an ordered group of rows and returns the rank as a number. Group Id is considered for the rank ordering in the above examples. Group Id is a unique id for each row within a given user Id. If the ranking need to be calculated on a different column which is not unique across rows, other ranking functions such as ROW_NUMBER or custom functions can be used. In effect, there is a need to achieve a unique ranking across multiple rows to cater the pagination need. The ranks can be consecutive numbers beginning with 1 with the ordering being based on the number of values responsive to the query.

An alternative query approach is detailed below.

Query 2:
select U.Id as UserId, G.name as GroupName from user U
  left outer join (select *, dense rank( ) over (partition by UserId order by Id) as rank from group) G on (rank>=(offset) and rank<(offset+n) and U.Id=G.UserId) order by U.Id With the above, n refers to a number of association records and offset refers to a record offset to start the pagination. As an example, when n=10 and offset=30 ranked records 31-40 will be retrieved.

Sample Result (fetching 2 association rows at a time):

TABLE 3

| UserId | GroupName |
|---|---|
| 1 | Group-1 |
| 1 | Group-2 |
| 2 | Group-5 |
| 2 | Group-6 |
| 3 | Group-8 |
| 3 | Group-9 |
| 4 | Group-10 |

In order to get N associated records, ranking has to be calculated across all available records at run-time (as part of the dense ranking operation) by using relevant ordering criteria. This arrangement can negatively impact the performance (e.g., speed, consumption of computing resource, etc.) of the queries. In most cases where the number of read operations greatly exceed the number of write operations, having the ranking calculated at run-time is highly inefficient and results in sub-optimal performance.

Consider a query plan analysis for a User-Group table as described below in which there a Group table comprises 500000 records across multiple users. Table 4 is an example query plan for fetching 10 association rows.

Below is the SQL query that resulted in the query plan of Table 4.

select U.Id as UserId, G.name as GroupName from user U left outer join select *, dense rank( ) over (partition by uid order by id) as rank from group) G on (U.id=G.uid and rank1>1000 and rank1<=1010) where U.Id=1

TABLE 4

| OPERATION_NAME | OPERATOR_DETAILS | TABLE_NAME | SUBTREE_COST |
|---|---|---|---|
| ESX SEARCH | U.ID. G.GROUPNAME | | 0.6299994345779 |
| NESTED LOOP JOIN (LEFT OUTER) | | | 0.8005740168499 |
| COLUMN SEARCH | U.ID | | 0.0000001535152 |
| COLUMN TABLE | FILTER CONDITION: U.ID = 1 | USER | |
| WINDOW | WINDOW FUNC: DENSE_RANK( ) PARTITIONING: Group: UID SORTING: Group.ID ASC. FILTER CONDITION: G.RANK1 > 1000 AND G.RANK1 <= 1010 | | 0.5944904358348 |

TABLE 4-continued

| OPERATION_NAME | OPERATOR_DETAILS | TABLE_NAME | SUBTREE_COST |
|---|---|---|---|
| COLUMN SEARCH | Group.ID, G.NAME, Group.UID | | 0.509090909091 |
| COLUMN TABLE | FILTER CONDITION: G.UID = 1 | Group | |

As can be seen, the sub tree cost of DENSE_RANK( ) function is significant compared to overall cost. Even though the subtree costs can vary based on the database and load on the database at that point of time, it is important to note that DENSE_RANK( ) function contributes to larger amount of subtree cost. This is because the DENSE_RANK( ) function calculates ranks across all available rows to filter the 10 rows and ranking across all rows is vital for correct pagination. It is important to note that irrespective of the ranking function or strategy used, the cost of the whole query is largely increased by the ranking cost. The pagination queries can additionally work over an offset (which can be user-specified based on how many records are to be displayed at any given time) which will be used across multiple calls by the client. Hence the ranking has to be consistent across multiple calls. While there can be scenarios in which ranking differs due to the new data across multiple calls; such an arrangement is typically acceptable due to the changes in the underlying data. When there is no new data the ranking across calls must be consistent.

The problem becomes more complex whenever more than one table is joined and pagination need to be applied on them. In that case the queries calculate ranking using a ranking function such as DENSE_RANK on all association tables. This operation can be parallelized in some situations by query optimizers but this typically will require greater levels of CPU usage depending on the data.

With the current subject matter, instead of calculating ranks on the fly during runtime (e.g., using a dense rank operation, etc.), ranks can be pre-calculated and the corresponding tables can be updated to include additional fields specifying such ranks. As noted in Table 4 above, the run-time overhead for DENSE_RANK is costly. By using pre-calculated rankings, queries can run more quickly given that there is no run-time overhead for CPU and Memory for calculations of DENSE_RANK, Further, pre-calculated rankings are also advantageous in that they provide for reduced query complexity as the corresponding database operations operate directly on columns without the need for inner queries.

Reference is made to the following tables with one to many relationships with ranks pre-calculated.

TABLE 5

| User Table | |
|---|---|
| Id | Name |
| 1 | User-1 |
| 2 | User-2 |
| 3 | User-3 |
| 4 | User-4 |
| 5 | User-5 |

TABLE 6

| Group Table | | | |
|---|---|---|---|
| Id | Name | UserId | Rank |
| 1 | Group-1 | 1 | 1 |
| 2 | Group-2 | 1 | 2 |
| 3 | Group-3 | 1 | 3 |
| 4 | Group-4 | 1 | 4 |
| 5 | Group-5 | 2 | 1 |
| 6 | Group-6 | 2 | 2 |
| 7 | Group-7 | 2 | 3 |
| 8 | Group-8 | 3 | 1 |
| 9 | Group-9 | 3 | 2 |
| 10 | Group-10 | 4 | 1 |

To fetch user and its associations say n at a time, the following query would suffice.

Query:
select U.Id, G.name as GroupName from user U left outer join
(select * from group where (rank>=offset and rank< (offset+n))) G on (U.id=G.uid)
order by U.Id Following is a query plan (for a table with 500000 association rows) for fetching 10 association rows from an offset and it can be seen that the query plan is pretty straight forward and highly efficient.

Below is the SQL query that resulted in the query plan of Table 7.

select U.Id as UserId, G.name as GroupName from user U left outer join (select * from group) G
on (U.id=G.uid and (rank>1000 and rank<=1010))
order by U.Id

TABLE 7

| OPERATOR_NAME | OPERATOR_DETAILS | TABLE_NAME | SUBTREE_COST |
|---|---|---|---|
| COLUMN SEARCH | U.ID, G.NAME | | 0.00172657 |
| ORDER BY | U.ID ASC | | 0.000827967 |
| JOIN | JOIN CONDITION: (LEFT OUTER) U.ID = GUID | | 0.000773878 |
| COLUMN TABLE | | USER | |
| COLUMN TABLE | FILTER CONDITION: Group.RANK > 1000 AND Group.RANK <= 1010 | Group | |

As there is no ranking calculation at run-time, there is a huge difference in the subtree cost. These improvements translates to a better run-time. Furthermore, this arrangement is advantageous in that there is less CPU and memory consumption by avoiding the run-time ranking calculation.

Various techniques can be used to calculate the pre-calculated ranking of the records. Below are two example techniques (referred to for ease of reference as Approach 1 and Approach 2).

Approach 1 relates to the calculation of rankings during inserts/updates of a parent record and its associations (parent as defined by an association).

Let a parent table be called PT. Let an association table be called as AT.

Let PR be the parent row that is being added/updated.

Let ARows be the corresponding association rows that need to be updated. NOTE: In this scenario, the full update of associations is considered.

Let ERows be the existing association rows in DB.

The following algorithm calculates the rank along with the parent row insert/update.

Load the parent row PR in memory.
If parent row in already in the database, add/update all direct row attributes.
Load all existing association ERows rows in memory<Load only required columns>
Declare Array: Inserts, Updates, Deletes
Declare HashMap: CurrentRows
//Calculation of addition/intersection/deletion
For each ERow of ERows
   Calculate hashId of ERow considering relevant unique columns.
   Add hashId, ERow to CurrentRows
For each ARow of ARows
   Calculate hashId of ARow considering relevant unique columns.
   If CurrentRows contains hashId
     Put ARow in Updates
   Else
     Put ARow in Inserts
   Delete hashId from CurrentRows
For each hashId in CurrentRows
   Put ERow for hashId in Deletes
//Ranking calculation
Sort Inserts+Updates based on relevant ranking column.
For each Inserts+Updates
Update the ranking column based on sort result.
Form query Q for PR
Form Inserts, Updates, Deletes query for ARows.
Execute all the queries. (Q,Inserts,Updates,Deletes)

Figure 1:
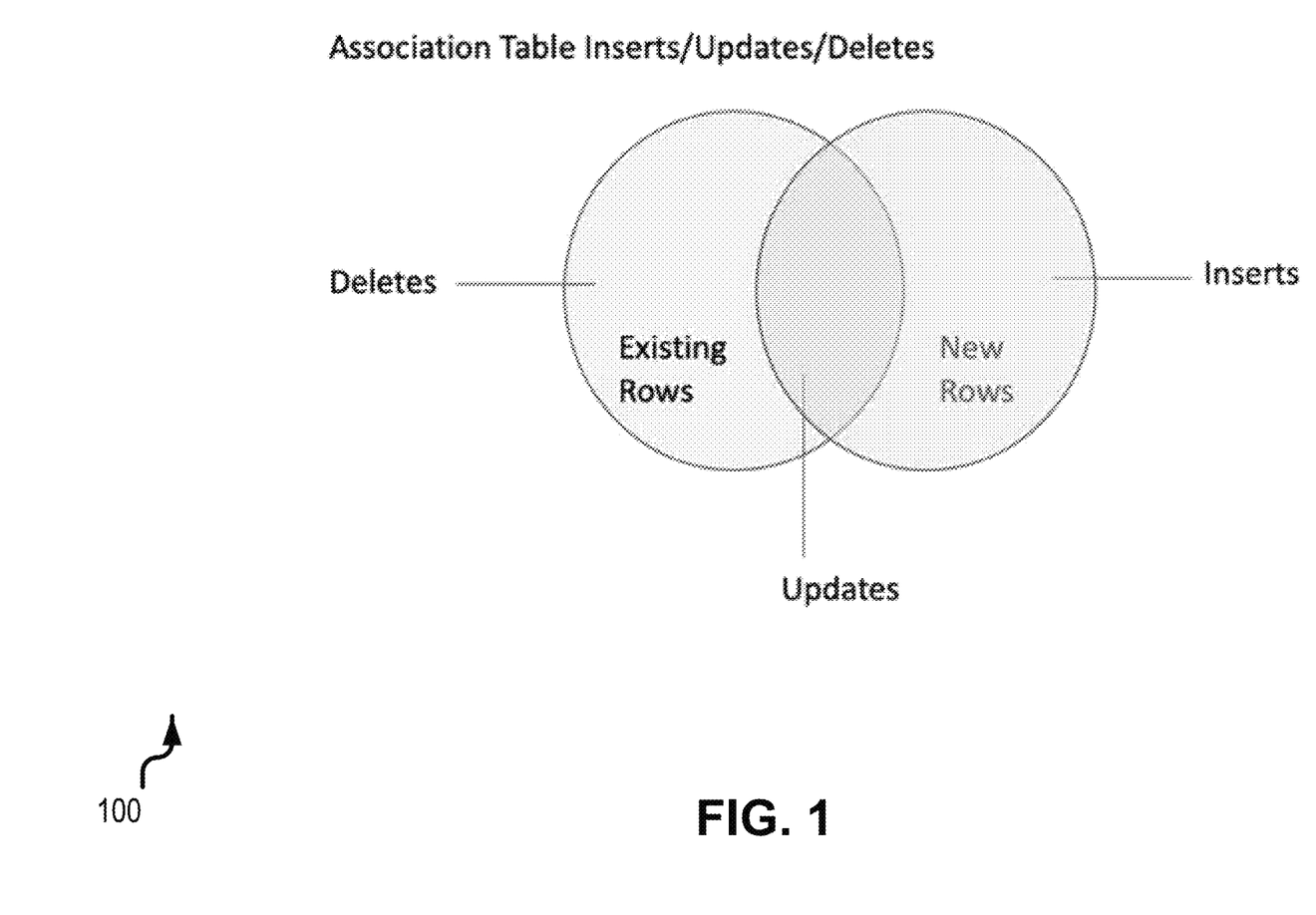
FIG. 1 is a diagram illustrating relationship among association table inserts/updates/and deletes.

At a high-level, whenever there is a update of parent table row the intersection, addition and deletion of associated rows is calculated. This is needed in order to maintain the correct associations for the given entity. For reference, see diagram 100 of FIG. 1.

The ranking calculated in above algorithm is the only extra step which runs quite efficiently as it is an in-memory operation (i.e., the operations specified by the algorithm can be performed solely on data loaded into memory of an in-memory database as opposed to accessing data from physical persistence). The sorting can be performed very efficiently if the ARows and ERows (when loaded from database) are already sorted with the required sort keys.

In case of an incremental database update, then the relevant inserts/updates/deletes of association would be determined. In such a scenario, there is a need to calculate the rank by loading all the required associations (ERows) and calculate the ranking. This is a slight over-head in case of incremental updates. The loading of associations in memory can be optimized to include only the columns that are needed for the calculation of the ranking. Considering the cost benefit with respect to lookups, this is an acceptable approach.

Figure 2:
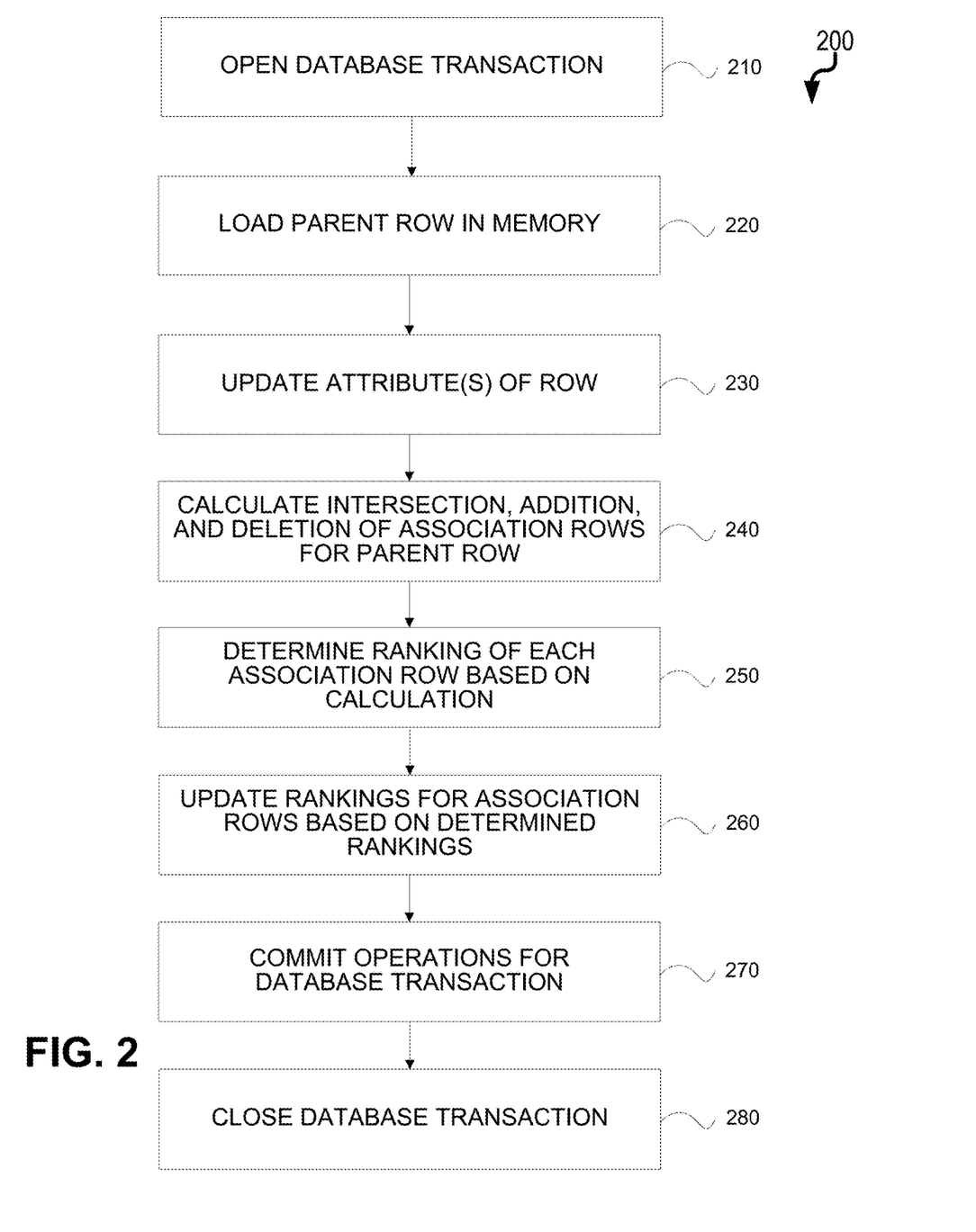
FIG. 2 is a first process flow diagram illustrating an approach for pre-calculated association pagination ranking.

FIG. 2 is a process flow diagram 200 illustrating a technique for calculating the rank that enables efficient database query handling in which, at 210, a database transaction is opened. Thereafter, at 220, a parent row is loaded into memory. Subsequently, at 230, at least one attribute in the parent row is updated. Next, at 240, an intersection, addition, and deletion of association rows corresponding to the parent row is calculated. A ranking is then determined, at 250, for each association row based on the calculation. Rankings for the association rows are later updated, at 260, based on the determined rankings. Subsequently, at 270, the operations for the transaction are committed, and at 280, the database transaction is closed.

Approach 2: There could be scenarios where the entire ranking calculation need to be run in the background. This might be needed in some places where the additional logic of ranking cannot be done along with association table inserts/updates/deletes. In such cases, the ranking algorithm can run in the background. A fallback approach (to calculate rank run-time) can be used if all the rank columns are NULL. Depending upon when the ranks are updated there could be some delay in the associated pagination result. Considering that the ranks are calculated in background, the delay is expected. Here by depicting a simple stored procedure for calculating the rank. This could be triggered by a background task from the application.

```
DO
BEGIN
DECLARE i INT;
DECLARE j INT;
DECLARE uid INT;
-- Open a cursor for user rows.
DECLARE CURSOR u_cursor FOR select * from user;
OPEN u_cursor;
FOR user_row AS u_cursor
DO
    -- Open a cursor for group rows which includes calculated rank.
    -- RANK is calculated using DENSE_RANK function.
    -- This cursor hold a content view with the id, rank.
    DECLARE CURSOR g_cursor FOR select id,rank1 from
    (
        select *,dense_rank( ) over(partition by uid order by id) as rank1
        from group G where g.uid=user_row.id
    );
```

```
    OPEN g_cursor;
    j = 0;
    FOR cur_row AS g_cursor
        DO
            -- Get the rank.
            i = cur_row.rank1;
            -- Get the group row id.
            j = cur_row.id;
            -- Update the row with rank.
            UPDATE group SET rank = :i where id = :j;
        END FOR;
        -- Close group cursor.
        CLOSE g_cursor;
        -- Commit the current user row.
        COMMIT;
END FOR;
-- Close user cursor.
CLOSE u_cursor;
END;
```

The above stored procedure is a simple template which could be used to update the relevant rankings. The rankings can be calculated by including relevant columns in the order by clause. There could be multiple variations to the above template depending upon the need. Individual or groups of user rankings can be updated instead of all the users. One of the things to note is that this template works over a cursor of rows which could be in-efficient in some scenarios. There could also be variations to avoid the cursor usage if needed. The following procedure is one such implementation which tries to avoid a cursor usage and relies on DB update to be more performant than the cursor implementations.

```
DO
BEGIN
DECLARE i INT;
DECLARE j INT;
DECLARE uid INT;
-- Open a cursor for user rows.
DECLARE CURSOR u_cursor FOR select * from user;
OPEN u_cursor;
FOR user_row AS u_cursor
DO
    -- Do DB update across all available rows.
    -- This method avoids cursor row selections.
    UPDATE group T1 SET rank =
    (select rank1 from (
    select *,dense_rank( ) over(partition by uid order by id) as rank1 from
    group where uid=user_row.id) T2
        WHERE T1.id = T2.id
) WHERE T1.uid = user_row.id;
    COMMIT;
END FOR;
END;
```

Figure 3:
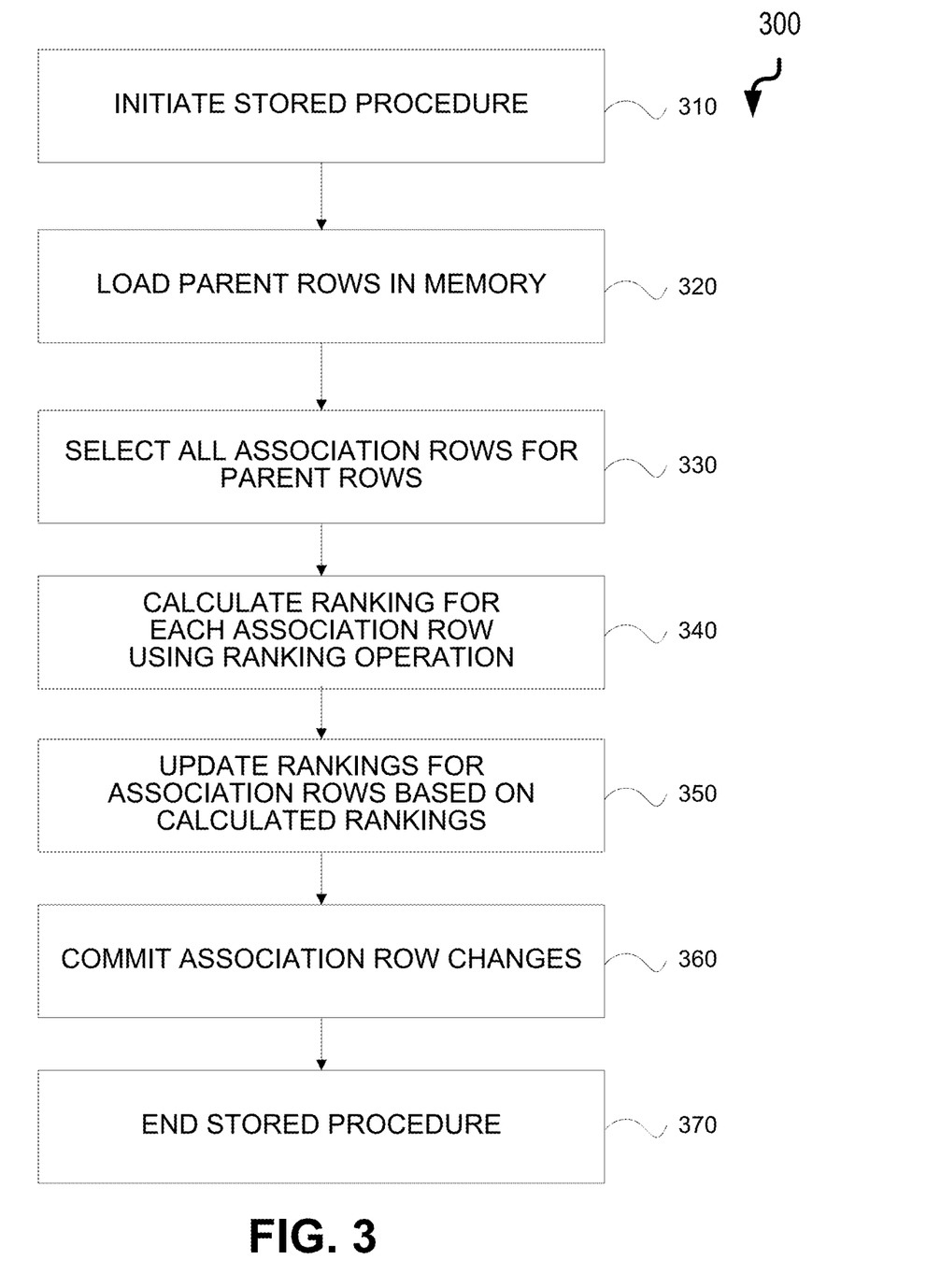
FIG. 3 is a second process flow diagram illustrating an approach for pre-calculated association pagination ranking.

FIG. 3 is a process diagram 300 for calculating rank that enables efficient database query handling in which, at 310, a stored procedure is initiated. Thereafter, at 320, all parent rows are loaded in memory. Next, at 330, for each parent row, all association rows for such parent row are selected. In addition, at 340, a rank for each of the association rows is determined, for example, by using a ranking function such as a DENSE_RANK algorithm. Each association row is then updated, at 350, with the corresponding ranking information. The changes to the association rows can, at 360, then be committed. The stored procedure is then, at 370, terminated.

In both the above approaches, there can be other additional strategies. There might be cases where the pagination is needed based on different column ordering in different scenarios. In such cases, multiple ranking columns can be calculated (Example: rank_id, rank_name) and persisted. When the query is made, relevant ranking column based on the need can be selected to do the pagination.

Figure 4:
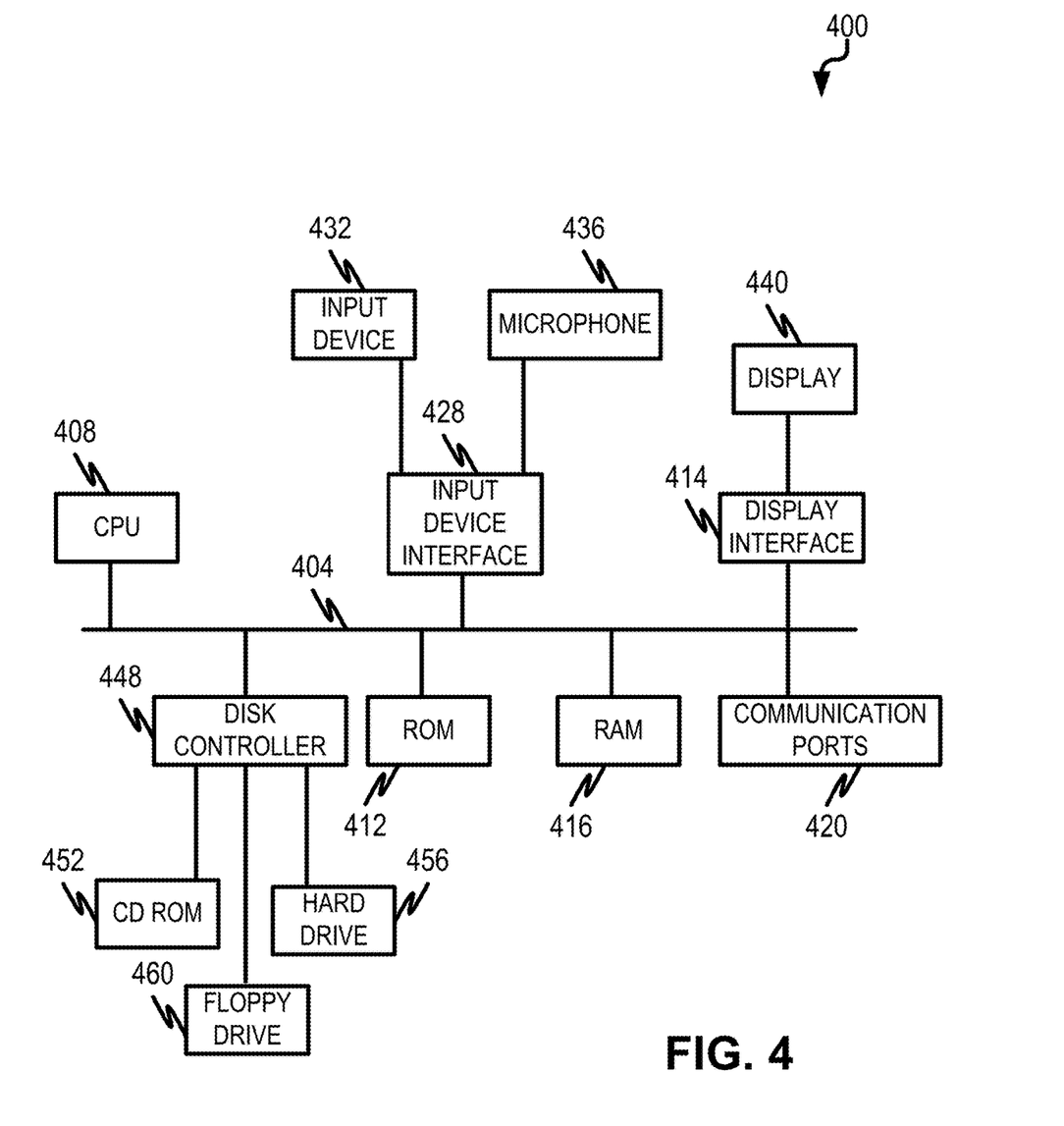
FIG. 4 is a diagram illustrating aspects of a computing device for implementing the current subject matter.

FIG. 4 is a diagram 400 illustrating a sample computing device architecture for implementing various aspects described herein. A bus 404 can serve as the information highway interconnecting the other illustrated components of the hardware. A processing system 408 labeled CPU (central processing unit) (e.g., one or more computer processors/data processors at a given computer or at multiple computers), can perform calculations and logic operations required to execute a program. A non-transitory processor-readable storage medium, such as read only memory (ROM) 412 and random access memory (RAM) 416, can be in communication with the processing system 408 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 448 can interface with one or more optional disk drives to the system bus 404. These disk drives can be external or internal floppy disk drives such as 460, external or internal CD-ROM, CD-R, CD-RW or DVD, or solid state drives such as 452, or external or internal hard drives 456. As indicated previously, these various disk drives 452, 456, 460 and disk controllers are optional devices. The system bus 404 can also include at least one communication port 420 to allow for communication with external devices either physically connected to the computing system or available externally through a wired or wireless network. In some cases, the at least one communication port 420 includes or otherwise comprises a network interface.

To provide for interaction with a user, the subject matter described herein can be implemented on a computing device having a display device 440 (e.g., a CRT (cathode ray tube) or LCD (liquid crystal display) monitor) for displaying information obtained from the bus 404 via a display interface 414 to the user and an input device 432 such as keyboard and/or a pointing device (e.g., a mouse or a trackball) and/or a touchscreen by which the user can provide input to the computer. Other kinds of input devices 432 can be used to provide for interaction with a user as well; for example, feedback provided to the user can be any form of sensory feedback (e.g., visual feedback, auditory feedback by way of a microphone 436, or tactile feedback); and input from the user can be received in any form, including acoustic, speech, or tactile input. The input device 432 and the microphone 436 can be coupled to and convey information via the bus 404 by way of an input device interface 428. Other computing devices, such as dedicated servers, can omit one or more of the display 440 and display interface 414, the input device 432, the microphone 436, and input device interface 428.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for enabling efficient database query handling comprising:
   modifying an association database table to include pre-calculated association pagination rankings, wherein the association database table corresponds to a parent database table;
   loading a parent row from the parent database table into memory;
   updating at least one attribute in the parent row;
   calculating an intersection, addition, and deletion of association rows from the association database table corresponding to the parent row;
   determining an association pagination ranking value for each association row based on the calculating;
   updating the pre-calculated association pagination rankings for the association rows with the determined values;
   receiving, by the database, a query specifying an offset and a number of ranked records; and providing results responsive to the query using the pre-calculated association pagination rankings in association rows responsive to the query.

2. The method of claim 1, wherein the determining comprises:
loading all association rows into memory.

3. The method of claim 1, wherein the calculating comprises:
determining whether each association row has been updated or inserted; and
sorting the association rows that have been updated or inserted by a corresponding pre-calculated association pagination ranking column; and
updating a ranking column for at least a portion of the association rules based on the sorting.

4. The method of claim 1 further comprising:
opening a database transaction to cause the loading of the parent row.

5. The method of claim 4 further comprising:
committing operations specified by the database transaction; and
closing the database transaction after the operations are committed.

6. A system for enabling efficient database query handling comprising:
at least one data processor; and
memory comprising instructions which, when executed by the at least one data processor, result in operations comprising:
modifying an association database table to include pre-calculated association pagination rankings, wherein the association database table corresponds to a parent database table;
loading a parent row from the parent database table into memory;
updating at least one attribute in the parent row;
calculating an intersection, addition, and deletion of association rows from the association database table corresponding to the parent row;
determining an association pagination ranking value for each association row based on the calculating;
updating the pre-calculated association pagination rankings for the association rows with the determined values;
receiving, by the database, a query specifying an offset and a number of ranked records; and
providing results responsive to the query using the pre-calculated association pagination rankings in association rows responsive to the query.

7. The system of claim 6, wherein the determining comprises:
loading all association rows into memory.

8. The system of claim 6, wherein the calculating comprises:
determining whether each association row has been updated or inserted; and
sorting the association rows that have been updated or inserted by a corresponding pre-calculated association pagination ranking column; and
updating a ranking column for at least a portion of the association rules based on the sorting.

9. The system of claim 6, wherein the operations further comprise:
opening a database transaction to cause the loading of the parent row.

10. The system of claim 9, wherein the operations further comprise:
committing operations specified by the database transaction; and
closing the database transaction after the operations are committed.

11. The system of claim 10 further comprising: the database.

12. A non-transitory computer program product comprising instructions for enabling efficient database query handling, the instructions, when executed by at least one computing device, result in operations comprising:
modifying an association database table to include pre-calculated association pagination rankings, wherein the association database table corresponds to a parent database table;
loading a parent row from the parent database table into memory;
updating at least one attribute in the parent row;
calculating an intersection, addition, and deletion of association rows from the association database table corresponding to the parent row;
determining an association pagination ranking value for each association row based on the calculating;
updating the pre-calculated association pagination rankings for the association rows with the determined values;
receiving, by the database, a query specifying an offset and a number of ranked records; and
providing results responsive to the query using the pre-calculated association pagination rankings in association rows responsive to the query.

13. The non-transitory computer program product of claim 12, wherein the determining comprises:
loading all association rows into memory.

14. The non-transitory computer program product of claim 12, wherein the calculating comprises:
determining whether each association row has been updated or inserted; and
sorting the association rows that have been updated or inserted by a corresponding pre-calculated association pagination ranking column; and
updating a ranking column for at least a portion of the association rules based on the sorting.

15. The non-transitory computer program product of claim 12, wherein the operations further comprise:
opening a database transaction to cause the loading of the parent row.

16. The non-transitory computer program product of claim 15, wherein the operations further comprise:
committing operations specified by the database transaction; and
closing the database transaction after the operations are committed.

17. The non-transitory computer program product of claim 12, wherein the database is an in-memory database.

* * * * *